(12) United States Patent
Shin et al.

(10) Patent No.: US 8,665,339 B2
(45) Date of Patent: Mar. 4, 2014

(54) OPTICAL IMAGE STABILIZER FOR CAMERA LENS MODULE

(75) Inventors: Doo-Sik Shin, Gyeonggi-do (KR); Jong-Suk Ro, Anyang-si (KR)

(73) Assignee: Samsung Electronics Co., Ltd (KR)

( * ) Notice: Subject to any disclaimer, the term of this patent is extended or adjusted under 35 U.S.C. 154(b) by 392 days.

(21) Appl. No.: 12/793,332

(22) Filed: Jun. 3, 2010

(65) Prior Publication Data

US 2010/0309323 A1 Dec. 9, 2010

(30) Foreign Application Priority Data

Jun. 3, 2009 (KR) .................. 10-2009-0048842

(51) Int. Cl.
*H04N 5/228* (2006.01)
*H04N 5/225* (2006.01)

(52) U.S. Cl.
USPC ....................................... 348/208.7; 348/374

(58) Field of Classification Search
USPC ........ 348/208.4, 208.7, 241, 374; 396/52–55; 310/323.17
See application file for complete search history.

(56) References Cited

U.S. PATENT DOCUMENTS

| | | | |
|---|---|---|---|
| 6,397,008 B2 * | 5/2002 | Kuwana et al. ................. | 396/55 |
| 6,539,174 B1 | 3/2003 | Kuwana et al. | |
| 7,529,476 B2 * | 5/2009 | Kurosawa ...................... | 396/55 |
| 8,164,637 B2 * | 4/2012 | Kawai ......................... | 348/208.4 |
| 2005/0185057 A1 | 8/2005 | Seo | |
| 2005/0259155 A1 | 11/2005 | Okada | |
| 2005/0259156 A1 | 11/2005 | Kosaka et al. | |
| 2006/0061660 A1 | 3/2006 | Brackmann | |
| 2006/0070302 A1 | 4/2006 | Seo | |
| 2006/0132631 A1 | 6/2006 | Yoshii et al. | |
| 2006/0133786 A1 * | 6/2006 | Teramoto ........................ | 396/55 |
| 2006/0269268 A1 * | 11/2006 | Chen et al. ..................... | 396/89 |
| 2007/0257989 A1 | 11/2007 | Shirono | |
| 2008/0055420 A1 | 3/2008 | Orihashi et al. | |
| 2009/0047009 A1 | 2/2009 | Nagano | |
| 2009/0052037 A1 | 2/2009 | Wernersson | |
| 2009/0097834 A1 | 4/2009 | Jang et al. | |

FOREIGN PATENT DOCUMENTS

| | | |
|---|---|---|
| JP | 2005-312244 | 11/2005 |
| JP | 2006-108956 | 4/2006 |
| JP | 2008-064863 | 3/2008 |

* cited by examiner

*Primary Examiner* — Daniel M Pasiewicz
(74) *Attorney, Agent, or Firm* — The Farrell Law Firm, P.C.

(57) ABSTRACT

An optical image stabilizer for a camera lens module, including a housing fixed to a case of the camera lens module, at least one piezoelectric actuator fixed to the housing, and an image sensor assembly housed in the housing. A driving tip of the piezoelectric actuator is curved in shape and makes a point contact with the image sensor assembly. If the piezoelectric actuator is driven, the image sensor assembly freely moves on a plane perpendicular to a photographing direction as the driving tip rubs against the image sensor assembly. This optical image stabilizer is simple in structure and easy to control, so it can be mounted in devices in which installation spaces are limited, like small digital cameras and mobile terminals.

15 Claims, 3 Drawing Sheets

OPTICAL IMAGE STABILIZER FOR CAMERA LENS MODULE

PRIORITY

This application claims priority under 35 U.S.C. §119(a) to a Korean Patent Application filed in the Korean Intellectual Property Office on Jun. 3, 2009 and assigned Serial No. 10-2009-0048842, the disclosure of which is incorporated herein by reference.

BACKGROUND OF THE INVENTION

1. Field of the Invention

The present invention relates generally to a camera lens module, and more particularly, to an optical image stabilizer for correcting images that are blurred by movement of the user's hand while a user takes a picture of a subject by means of a camera lens module mounted in a digital camera or a mobile terminal.

2. Description of the Related Art

With the increasing compactness and lightweight design of digital cameras, small photographing devices, such as mobile terminals equipped with an optical lens and an image sensor, have become more widespread.

In the case of a camera lens module mounted in a mobile terminal, where mobility is higher than that of other optical devices, image blurring becomes more frequent and intensified as a result of small vibrations and/or hand-movement occurring during image or video photographing. Photographing on the move will only become more frequent, and therefore, blurring of captured images, should be corrected in order to capture sharp images.

Despite the advent of high-resolution cameras due to advances in optical technologies, the benefits of mounting the high-resolution cameras on mobile terminals has been reduced due to image blurring caused by vibrations and hand-movement, increasing the need for an optical image stabilizer.

Presently, the image stabilization technologies may be roughly classified into two types. The first is Digital Image Stabilization (DIS), also known as Electronic Image Stabilization (EIS), which is an electronic hand-movement correction technology. This technology detects hand movement from the captured images and corrects the data stored in an image sensor or a memory. The image sensor receives the blurred images and adjusts positions and colors of the images in an electronic way or with a software application, making blur-free images.

Advantages of such an electronic hand-movement correction technology is that it is cheap in price because of the non-necessity of separate mechanical and physical structures and is easy to adopt due to few structural constraints. Disadvantages, however, are that this technology requires separate memories and/or high-performance image sensors since it corrects the images by means of software applications. Moreover, the prolonged time required to correct the blurred images decreases the photographing rate, and the limitation in removing the afterimages using applications may reduce the correction rate.

A second hand-movement correction technology includes Optical Image Stabilization (OIS). The OIS-based optical image stabilizer changes the position of an optical lens or an image sensor by detecting a user's hand movement and keeps the images formed on the image sensor stationary despite the vibrations of the photographing device.

Such an optical image stabilizer has a high manufacturing cost and requires an inconvenient amount of installation space, since a separate drive has to be installed. However, the optical image stabilizer may maintain a correction rate of over 90%, because it can remove the afterimages by forming blur-free images on the image sensor. Under the same conditions, the optical image stabilizer captures sharper images compared with the electronic image stabilizer. Therefore, the optical image stabilizer has been used more often than the electronic image stabilizer in photographing devices requiring high resolution.

Meanwhile, a technology for correcting images by shifting an optical lens is easy to mount in digital cameras having a space sufficient to install a built-in drive for driving the optical lens. However, since there are limitations in applying this technology to small digital cameras or mobile terminals having many spatial constraints, research has been conducted on improving technology for correcting hand movement by shifting the image sensor.

Since a significant driving force is needed to drive an optical lens having a certain weight, there is limited opportunity to miniaturize a driving device. Also, installing the driving device in portable photographing devices with rechargeable batteries creates further complications due to its large power consumption.

The difficulty in designing the small driving device and the rise in manufacturing costs due to the increase in number of parts are obstacles to securing a competitive price for photographing devices with an optical image stabilizer.

SUMMARY OF THE INVENTION

An aspect of the present invention is to address at least the above-mentioned problems and/or disadvantages and to provide at least the advantages described below. Accordingly, an aspect of the present invention provides an optical image stabilizer for a camera lens module, which can be embedded in small and lightweight photographing devices such as compact digital cameras and mobile terminals, and can enable the photographing of sharp images despite vibrations of the photographing devices due to hand movement or the like.

Another aspect of the present invention provides an optical image stabilizer, which has a simple structure and is easy to control.

In accordance with one aspect of the present invention, there is provided an optical image stabilizer for a camera lens module, including a housing fixed to a case of the camera lens module, at least one piezoelectric actuator fixed to the housing, and an image sensor assembly housed in the housing. A driving tip of the piezoelectric actuator is formed in a curved shape and makes a point contact with the image sensor assembly, and, if the piezoelectric actuator is driven, the image sensor assembly freely moves on a plane perpendicular to a photographing direction as the driving tip rubs against the image sensor assembly.

The image sensor assembly may include a heat sink, a first printed circuit board attached to the heat sink, and/or an image sensor mounted on the first printed circuit board. The first printed circuit board may be extended to surround the heat sink.

The optical image stabilizer may further include at least one magnetic substance mounted on the housing, and the magnetic substance may provide magnetic attraction to draw the heat sink against the housing.

The image sensor includes a heat sink, wherein the driving tip is preferably in point contact with the heat sink.

The optical image stabilizer may further include a second printed circuit board attached to one side of the housing and adjacent to the edge of the housing, and the piezoelectric actuator may be mounted on the second printed circuit board.

The optical image stabilizer may further include a hall sensor mounted on the second printed circuit board, and a sensor magnet substance that is attached to the image sensor assembly and faces the hall sensor.

The image sensor assembly may include a heat sink, a first printed circuit board attached to the heat sink, and an image sensor mounted on the first printed circuit board. The sensor magnet substance is preferably attached to the heat sink.

By driving of the piezoelectric actuator, the image sensor assembly is freely moveable in each of a first direction and a second direction perpendicular to the first direction within a plane perpendicular to the photographing direction. The image sensor assembly may rotate on its own axis within a plane perpendicular to the photographing direction.

BRIEF DESCRIPTION OF THE DRAWINGS

The above and other aspects, features and advantages of certain exemplary embodiments of the present invention will be more apparent from the following description taken in conjunction with the accompanying drawings, in which.

Throughout the drawings, the same drawing reference numerals will be understood to refer to the same elements, features and structures.

DETAILED DESCRIPTION OF EXEMPLARY EMBODIMENTS

Figure 1:
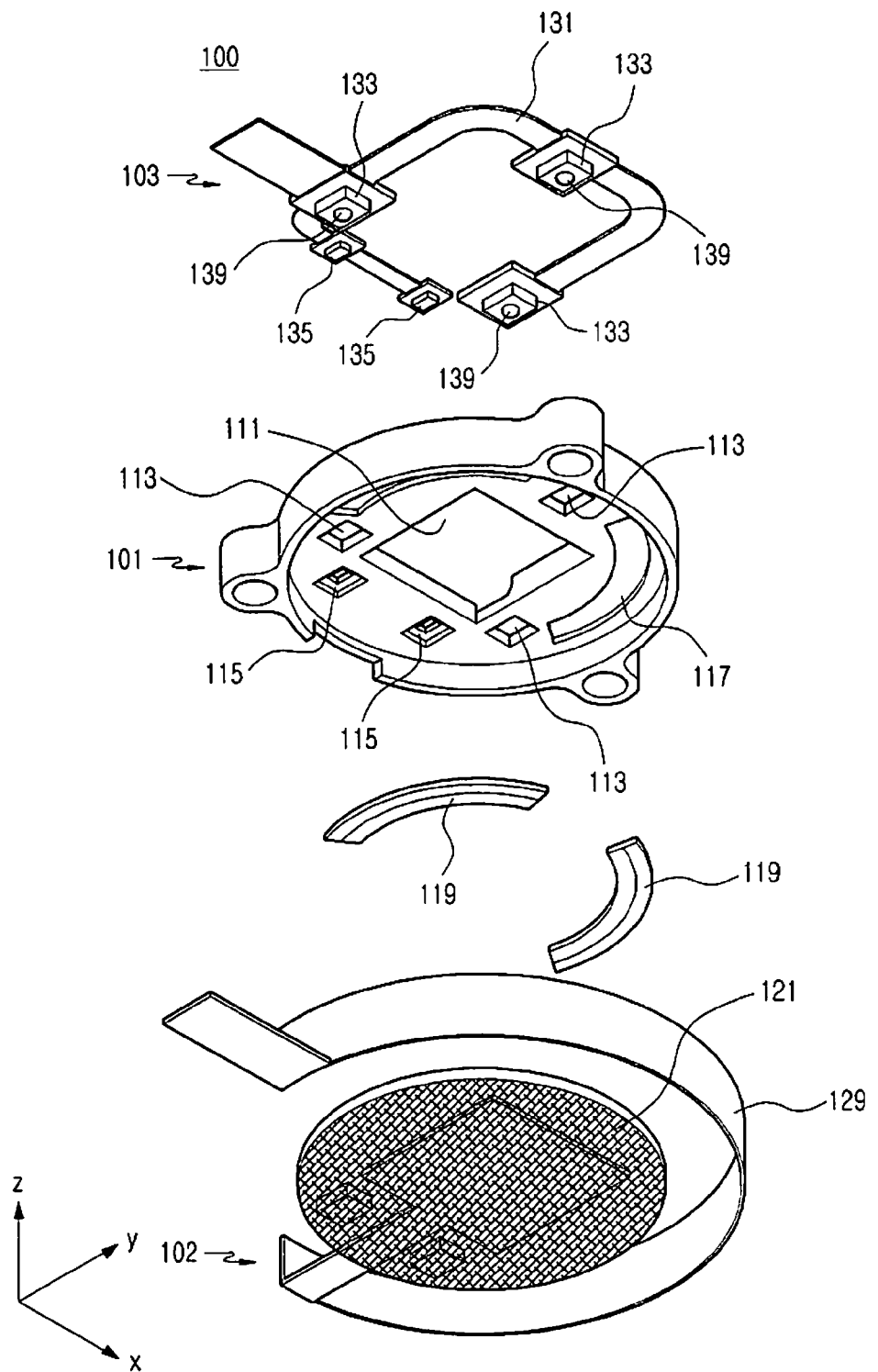
FIG. 1 is an exploded perspective view showing an optical image stabilizer for a camera lens module according to an embodiment of the present invention.
Figure 2:
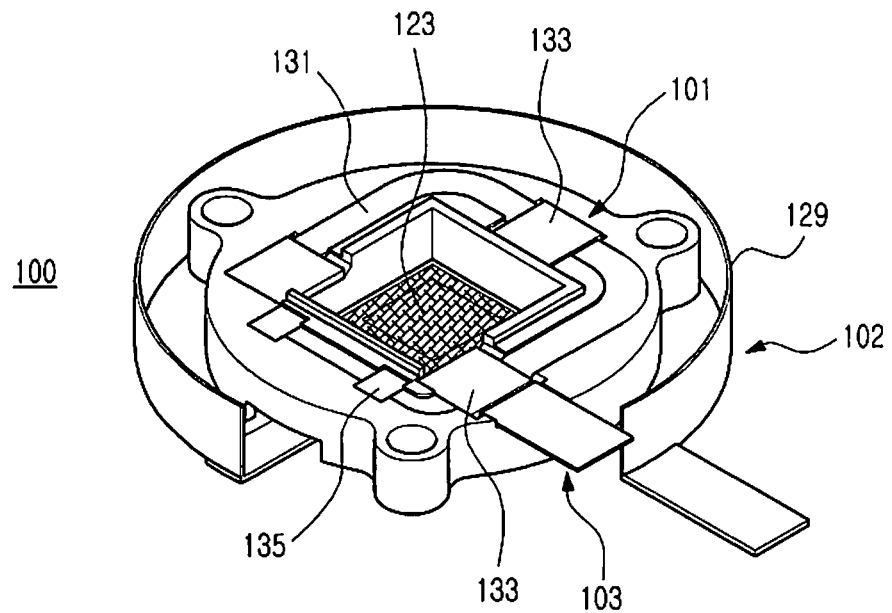
FIG. 2 is an assembled perspective view showing the optical image stabilizer shown in FIG. 1.
Figure 3:
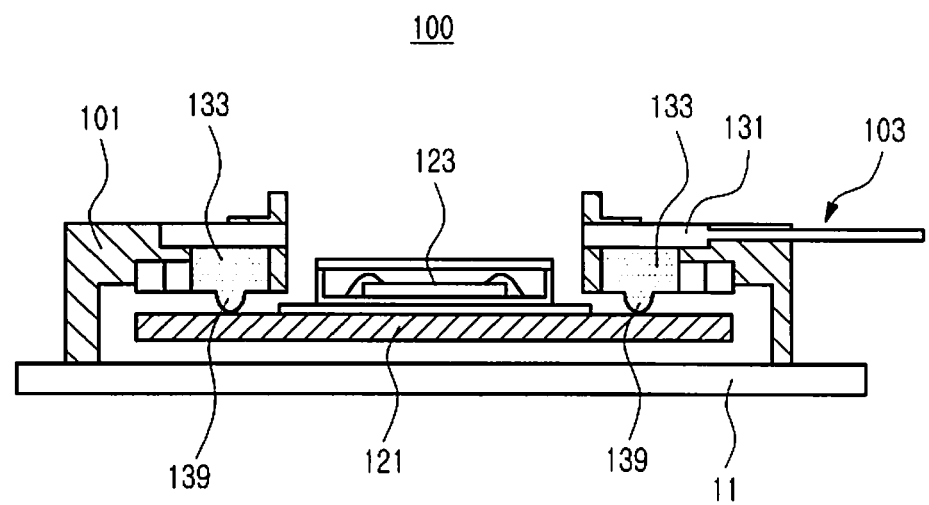
FIG. 3 is a cross-sectional view showing a cut section of the optical image stabilizer shown in FIG. 2.

Preferred embodiments of the present invention will now be described in detail with reference to the accompanying drawings. In the following description, detailed descriptions of known functions and configurations have been omitted for clarity and conciseness. Therefore, it should be apparent to those skilled in the art that various changes and modifications of the embodiments described herein can be made without departing from the scope and spirit of the invention.

As illustrated in FIGS. 1 to 5, an optical image stabilizer 100 for a camera lens module according to the present invention includes piezoelectric actuators 133 mounted on a housing 101, and an image sensor assembly 102 housed in the housing 101. As the piezoelectric actuators 133 are driven, the image sensor assembly 102 moves freely in the housing 101. Driving tips 139 of the piezoelectric actuators 133 are formed to have curved surfaces and make a point contact with the image sensor assembly 102. If the piezoelectric actuators 133 are driven, the driving tips 139 rub against the image sensor assembly 102, such that the image sensor assembly 102 moves freely on a plane perpendicular to the photographing direction z.

The housing 101 is fixed to a case 11 (shown in FIG. 3) of the camera lens module, and may have an actuator assembly 103 including the piezoelectric actuators 133, and magnetic substances 119. The housing 101 has one side on which the actuator assembly 103 is mounted, and another side in which a space capable of accommodating the image sensor assembly 102 is formed.

A photograph opening 111 accommodating an image sensor 123 is mounted on the image sensor assembly 102, and formed in housing 101, passing through both sides. Through-holes 113 are formed around the photograph opening 111. The number of through-holes 113 for accommodating the piezoelectric actuators 133 is equal to the number of the piezoelectric actuators 133 mounted in the actuator assembly 103. In addition, sensor openings 115 are formed around the photograph opening 111, passing through both sides of housing 101, in order to accommodate hall sensors 135 mounted in the actuator assembly 103. Installation surfaces 117 are formed between one through-hole 113 and another through-hole 113 adjacent thereto on the other side of the housing 101, so the magnetic substances 119 may be installed on their associated installation surfaces 117.

The image sensor assembly 102, as mentioned earlier, freely moves within a plane perpendicular to the photographing direction z, while it is accommodated in housing 101 to face another side of housing 101. The driving tips 139 of the piezoelectric actuators 133 are in point contact with the image sensor assembly 102, and if the piezoelectric actuators 133 are driven, the driving tips 139 freely move the image sensor assembly 102, rubbing against the image sensor assembly 102.

Figure 5:
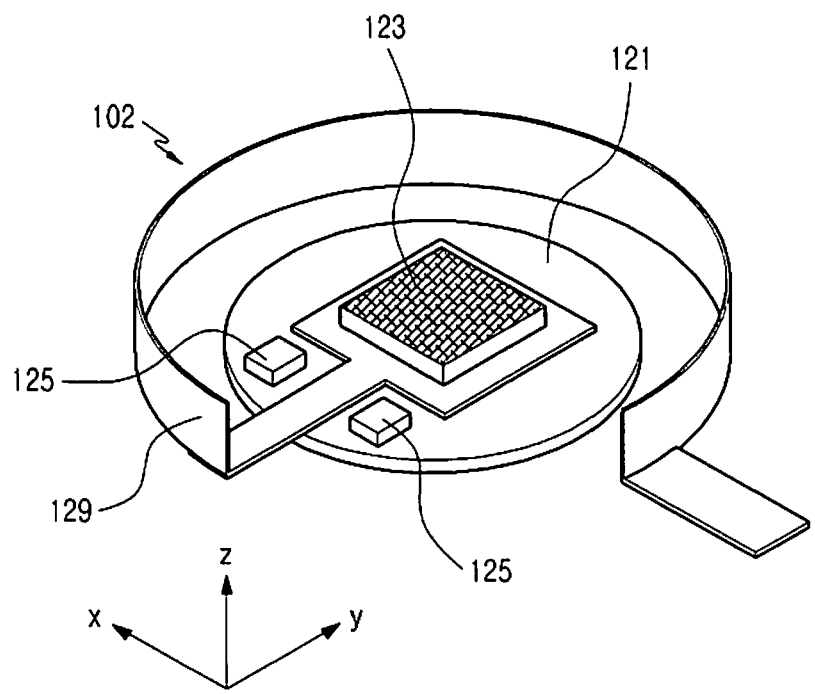
FIG. 5 is a perspective view showing an image sensor assembly of the optical image stabilizer shown in FIG. 1.

Referring to FIG. 5, the image sensor assembly 102 has a heat sink 121 in the form of a circular plate, and the image sensor 123 is mounted on one side of the heat sink 121. A first printed circuit board 129 for supplying power to the image sensor 123 and transmitting captured image signals is attached to one side of the heat sink 121, and the image sensor 123 is mounted on one side of the first printed circuit board 129. The first printed circuit board 129 is preferably a flexible printed circuit board, and it is at least the diameter of the heat sink 121. The first printed circuit board 129 surrounds the heat sink 121 at the outside of the heat sink 121. If the image sensor assembly 102 is housed in the housing 101, the first printed circuit board 129 surrounds the housing 101. Thus, while the image sensor assembly 102 is moving, the first printed circuit board 129 leaves sufficient free length in which the image sensor assembly 102 can move, minimizing any obstruction due to elasticity of the first printed circuit board 129 affecting the free movement of the image sensor assembly 102.

In addition, the image sensor assembly 102 may include sensor magnetic substances 125 attached to one side of the heat sink 121. If the image sensor assembly 102 is housed in the housing 101, the image sensor 123 is accommodated in the photograph opening 111, and the sensor magnetic substances 125 face their associated sensor openings 115 in the housing 101.

Since the heat sink 121 is made of metallic materials, the heat sink 121 not only radiates the heat generated from the image sensor 123, but also is magnetically attracted to the housing 101 by the magnetic substances 119 attached to the housing 101. Therefore, the image sensor assembly 102 remains connected to the housing 101, without installation of separate fastening means.

The actuator assembly 103 includes the piezoelectric actuators 133, and a second printed circuit board 131 for providing driving signals to the piezoelectric actuators 133. The hall sensors 135 are placed in their associated sensor openings 115, and wiring connected to the hall sensors 135 are also provided through the second printed circuit board 131. That is, by use of the second printed circuit board 131, the actuator assembly 103 provides power and signal wires to the piezoelectric actuators 133 and the hall sensors 135. The second printed circuit board 131 is placed adjacent to the edge of the housing 101 along the circumference of the photograph opening 111.

The piezoelectric actuator 133 may move the image sensor assembly 102, or more specifically the heat sink 121, in two directions. That is, by providing a pair of electrodes to each of the piezoelectric actuators 133 and controlling currents provided to the electrodes, it is possible to control the heat sink 121 to move in a first direction x and in a second direction y perpendicular to the first direction x. The heat sink 121 may move in two directions within a plane perpendicular to the photographing direction z of the image sensor 123.

In the embodiment of the present invention, three piezoelectric actuators 133 are placed at intervals of the same angle along the circumference of the photograph opening 111. The three piezoelectric actuators 133 are simultaneously driven in one direction along the circumferential direction of the heat sink 121, and the image sensor assembly 102 may rotate on its own axis within the housing 101.

Figure 4:
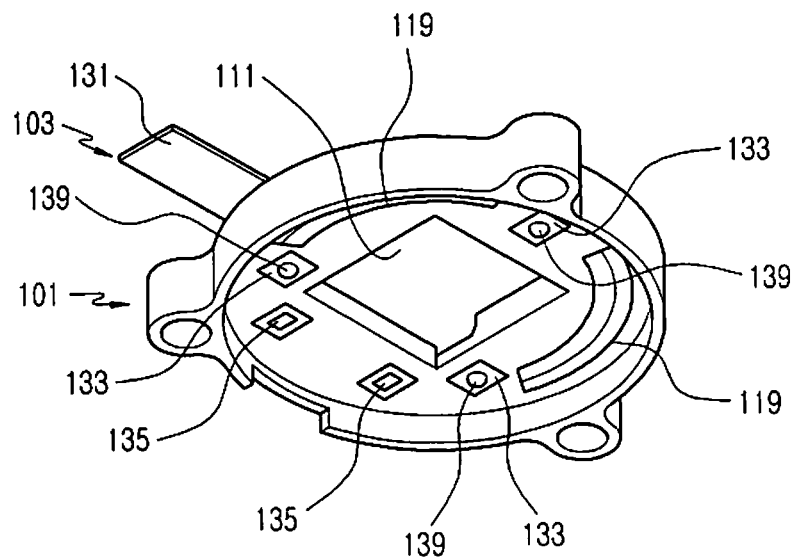
FIG. 4 is an assembled perspective view showing a housing of the optical image stabilizer shown in FIG. 1.

As shown in FIG. 4, if the actuator assembly 103 is mounted on one side of the housing 101, the piezoelectric actuators 133 are accommodated in their associated through-holes 113, and the hall sensors 135 are accommodated in their associated sensor openings 115. It is preferable to fix the piezoelectric actuators 133 to inner walls of the through-holes 113, and the hall sensors 135 inside the sensor openings 115 using an adhesive agent such as an epoxy, such that the actuator assembly 103 is installed on one side of the housing 101.

If the actuator assembly 103 is mounted on one side of the housing 101 and the piezoelectric actuators 133 are fixed, the driving tips 139 of the piezoelectric actuators 133 protrude into the other side of the housing 101. The image sensor assembly 102 is magnetically connected to the housing 101 by the magnetic substances 119. The driving tips 139 protrude into the other side of the housing 101 and the heat sink 121 is in contact with the driving tips 139. The driving tips 139 make a point contact with the heat sink 121 by being formed in a curved shape, such as a hemispheric shape or a spherical shape.

If the piezoelectric actuators 133 are driven, the driving tips 139 may move at high speed in a specific direction and at low speed in the opposite direction according to the signals applied to the piezoelectric actuators 133. When the driving tips 139 move at high speed, the heat sink 121 may remain in a standstill state by inertia. However, when the driving tips 139 move at low speed, the heat sink 121 may also freely move in the direction in which the driving tips 139 move, by the friction. Although the high-speed movement and the low-speed movement will not be described in detail herein, those of ordinary skill in the art easily understand the driving principles of the piezoelectric actuators.

If the actuator assembly 103 is mounted in the housing 101 and the image sensor assembly 102 is housed in the housing 101, since the heat sink 121 is magnetically attracted by the housing 101 by the magnetic substances 119, the driving tips 139 of the piezoelectric actuators 133 maintain contact with the heat sink 121, and the sensor magnet substances 125 face their associated sensor openings 115, thus meeting their associated hall sensors 135.

Here, a pair of sensor magnet substances 125 are provided. It is preferable that the N-pole and the S-pole are arranged on one of the sensor magnet substance 125 along a first direction, while the N-pole and the S-pole are arranged on the other sensor magnet substance 125 along a second direction. By sensing movements of the sensor magnet substances 125, the hall sensors 135 may detect the first and second directions in which the image sensor assembly 102 has moved, and the distance by which the image sensor assembly 102 has moved.

In the optical image stabilizer 100 with the structure described above, if driving signals are applied to the piezoelectric actuators 133 to move the image sensor assembly 102, the image sensor assembly 102 may move in the driving directions of the piezoelectric actuators 133. However, depending on the driving environment, a yawing phenomenon may occur, in which the image sensor assembly 102 is swayed from side to side with respect to the driving directions. This phenomenon inevitably occurs since the optical image stabilizer 100 is constructed to move the image sensor assembly 102, ultimately, the image sensor 123 in the first and second directions x and y, without providing a separate guidance means within one plane. However, it is possible to minimize the yawing phenomenon that occurs during a hand-movement correction operation by placing three piezoelectric actuators 133 at intervals of the same angle.

By detecting the moving directions of the image sensor assembly 102 and its moving distance using the hall sensors 135, it is possible to monitor whether the image sensor assembly 102 has moved in relation with the signals applied to the piezoelectric actuators 133. If the moving direction or moving distance of the image sensor assembly 102 is not coincident with the signals applied to the piezoelectric actuators 133, new driving signals may be applied to the piezoelectric actuators 133 to move again the image sensor assembly 102 in the intended directions.

In summary, the image sensor assembly 102 may move in first and second directions x and y, i.e., in two directions, within a plane perpendicular to the photographing direction z of the image sensor 123. If the image sensor assembly 102 rotates regardless of the driving (actuation) of the piezoelectric actuators 133 due to the yawing phenomenon depending on the driving environment, it is possible to rotate the image sensor assembly 102 by applying new driving signals to the piezoelectric actuators 133 to readjust the image sensor assembly 102 in the intended directions.

The image sensor assembly 102 is housed in the housing 101 such that it not only can move in at least two directions but also can rotate on its own axis within a plane perpendicular to the photograph direction z. Although it is preferable that the image sensor assembly 102 moves only in the first and second directions x and y by the piezoelectric actuators 133, where the yawing phenomenon inevitably occurs in the driving process, it is possible to inhibit such yawing phenomenon by applying new driving signals to the piezoelectric actuators 133.

According to the present invention, the optical image stabilizer 100 and the image sensor assembly 102 on which the image sensor 123 is mounted is housed in the housing 101 in a freely movable manner, make it possible to correct the blurring of captured images due to hand movement by adjusting or rotating the image sensor assembly 102 in various directions by means of the piezoelectric actuators 133 housed in the housing 101.

As is apparent from the foregoing description, the optical image stabilizer for a camera lens module according to the present invention can correct the position of the image sensor assembly. The image sensor using at least one piezoelectric actuator can be placed on one plane, facilitating miniaturization. Since the piezoelectric actuator may be driven in at least two directions in contact with the image sensor assembly, it is possible to move the image sensor assembly in the first direction and the second direction perpendicular to the first direction within a plane perpendicular to the photographing direction. Thus, the hand movement correction may be achieved with only one piezoelectric actuator, thereby simplifying the structure of the optical image stabilizer.

Such a compact and simple optical image stabilizer may be installed even in photographing devices in which installation spaces can be hardly secured, like small digital cameras and mobile terminals. If the image sensor assembly is constructed such that the image sensor is mounted on a heat sink and the heat sink is placed to make a contact with the driving tip of the piezoelectric actuator, it is possible to move the heat sink in at least two directions using the piezoelectric actuator, which contributes to simplification of the optical image stabilizer.

While two-direction hand movement correction has been conventionally implemented by placing an X-axis piezoelectric device and a Y-axis piezoelectric device and installing a separate support unit supporting these devices, the optical image stabilizer according to the present invention is realized to enable the two-direction hand movement correction with only one piezoelectric actuator, by installing the image sensor assembly in the housing in a movable manner. By doing so, it is possible to simplify the structure of the optical image stabilizer and reduce dissipation of the power required for the hand movement correction, contributing to increasing portability of the compact photographing devices equipped with the optical image stabilizer.

While the invention has been shown and described with reference to certain exemplary embodiments thereof, it will be understood by those skilled in the art that various changes in form and details may be made therein without departing from the spirit and scope of the invention as defined by the appended claims and their equivalents thereof.

What is claimed is:

1. An optical image stabilizer for a camera lens module, comprising:
   a housing fixed to a case of the camera lens module;
   at least one piezoelectric actuator fixed to the housing; and
   an image sensor assembly housed in the housing;
   wherein a driving tip of the piezoelectric actuator is formed in a curved shape and makes a point contact with the image sensor assembly, and when the driving tip laterally rubs against the image sensor assembly from a driving of the piezoelectric actuator, the image sensor assembly freely moves along a rubbing direction of the driving tip of the driven piezoelectric actuator on a plane perpendicular to a photographing direction.

2. The optical image stabilizer of claim 1, wherein the image sensor assembly comprises:
   a heat sink;
   a first printed circuit board attached to the heat sink; and
   an image sensor mounted on the first printed circuit board;
   wherein the first printed circuit board extends to surround the heat sink.

3. The optical image stabilizer of claim 2, further comprising at least one magnetic substance mounted on the housing, wherein the magnetic substance draws the heat sink against the housing.

4. The optical image stabilizer of claim 2, wherein the driving tip is in point contact with the heat sink.

5. The optical image stabilizer of claim 1, further comprising a second printed circuit board that is attached to one side of the housing and is adjacent to the edge of the housing;
   wherein the piezoelectric actuator is mounted on the second printed circuit board.

6. The optical image stabilizer of claim 5, further comprising a hole formed in the housing;
   wherein the piezoelectric actuator is accommodated in the hole, and the driving tip protrudes into another side of the housing.

7. The optical image stabilizer of claim 6, wherein the piezoelectric actuator is fixed to an inner wall of the hole.

8. The optical image stabilizer of claim 1, wherein three piezoelectric actuators are placed at intervals of a same angle along the circumference of the housing.

9. The optical image stabilizer of claim 5, wherein three piezoelectric actuators are placed at intervals of a same angle along the circumference of the housing.

10. The optical image stabilizer of claim 5, further comprising:
    a hall sensor mounted on the second printed circuit board; and
    a sensor magnet substance that is attached to the image sensor assembly and faces the hall sensor.

11. The optical image stabilizer of claim 10, wherein the image sensor assembly comprises:
    a heat sink;
    a first printed circuit board attached to the heat sink; and
    an image sensor mounted on the first printed circuit board;
    wherein the sensor magnet substance is attached to the heat sink.

12. The optical image stabilizer of claim 2, further comprising a photograph opening formed to pass through both sides of the housing;
    wherein the image sensor is accommodated in the photograph opening.

13. The optical image stabilizer of claim 10, further comprising a photograph opening formed to pass through both sides of the housing;
    wherein the image sensor is accommodated in the photograph opening.

14. The optical image stabilizer of claim 1, wherein the image sensor assembly is moveable in each of a first direction and a second direction, wherein the first direction is perpendicular to the second direction and the first direction and second direction are within a plane perpendicular to the photographing direction.

15. The optical image stabilizer of claim 1, wherein the image sensor assembly rotates on its own axis within a plane perpendicular to the photographing direction.

* * * * *